United States Patent
Chiu

(10) Patent No.: US 9,467,758 B2
(45) Date of Patent: Oct. 11, 2016

(54) TESTING SYSTEM AND METHOD

(71) Applicant: Accton Technology Corporation, Hsinchu (TW)

(72) Inventor: Kuo-En Chiu, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 84 days.

(21) Appl. No.: 14/482,741

(22) Filed: Sep. 10, 2014

(65) Prior Publication Data

US 2016/0011264 A1 Jan. 14, 2016

(30) Foreign Application Priority Data

Jul. 11, 2014 (TW) .............................. 103123896 A

(51) Int. Cl.
| | | |
|---|---|---|
| G01R 31/00 | (2006.01) | |
| H04Q 11/00 | (2006.01) | |
| H04J 14/02 | (2006.01) | |

(52) U.S. Cl.
CPC ........... H04Q 11/0067 (2013.01); H04J 14/02 (2013.01)

(58) Field of Classification Search
CPC .................. G01R 31/31917; G01R 31/31901; G01R 31/319; G01R 31/3191; G01R 31/318569; G01R 31/318522; G01R 31/31813; G01R 31/31728; G01R 31/1218
USPC .............. 324/383, 501, 537, 750.01, 750.02
See application file for complete search history.

(56) References Cited

U.S. PATENT DOCUMENTS

| | | | | |
|---|---|---|---|---|
| 6,104,477 A | | 8/2000 | Yoshida et al. | |
| 2003/0189701 A1* | | 10/2003 | Franke ................ | H04B 10/07 356/73.1 |
| 2004/0019459 A1* | | 1/2004 | Dietz .................. | G01M 11/335 702/184 |
| 2007/0264010 A1* | | 11/2007 | Bartolini ............. | G01J 3/28 398/9 |
| 2008/0226288 A1* | | 9/2008 | Miller ................. | H04B 10/073 398/9 |
| 2011/0279109 A1* | | 11/2011 | Masuda .............. | G01R 31/31917 324/96 |
| 2012/0269521 A1* | | 10/2012 | Masuda .............. | H01S 5/06821 398/182 |

FOREIGN PATENT DOCUMENTS

| | | |
|---|---|---|
| CN | 202696605 U | 1/2013 |
| CN | 103763019 A | 4/2014 |

* cited by examiner

*Primary Examiner* — Son Le
*Assistant Examiner* — Thang Le
(74) *Attorney, Agent, or Firm* — Birch, Stewart, Kolasch & Birch, LLP

(57) ABSTRACT

A testing system and method are provided. The testing system includes a terminal device (Optical Line Terminal, OLT) which is configured to provide an optical signal, an optical attenuator which is configured to generate an attenuation optical signal according to the optical signal, a tested device which is configured to generate an analog-to-digital (AD) value corresponding to the attenuation optical signal, and a test-managing device which is configured to receive the analog-to-digital (AD) value and generate calibration values according to the analog-to-digital (AD) value and the attenuation optical signal and transmit the calibration values to the tested device to test the tested device.

10 Claims, 2 Drawing Sheets

TESTING SYSTEM AND METHOD

CROSS REFERENCE TO RELATED APPLICATIONS

This Application claims priority of Taiwan Patent Application No 103123896, filed on Jul. 11, 2014, the entirety of which is incorporated by reference herein.

BACKGROUND OF THE INVENTION

1. Field of the Invention

The invention generally relates to testing technology, and more particularly, to the Digital Diagnostic Monitoring Interface (DDMI) calibration test of RX POWER.

2. Description of the Related Art

With the development of network technology, optical network technologies have seen more and more progress. Passive Optical Network (PON) is one of the important optical network technologies. Comparing with the traditional Point to Point (P2P) network structure for the optical terminal, the Passive Optical Network adopts Point to Multipoint (P2MP) network structure. In the Passive Optical Network, the Optical Line terminal (OLT) transmits data to many Optical Network Units (ONUs) through an Optical Splitter for reducing the requirement of the fiber and the optical elements. The Passive Optical Network technology comprises Ethernet Passive Optical Network (EPON) technology, Gigabit Passive Optical Network (GPON) technology, and so on.

The Gigabit Passive Optical Network technology is a standard which is specified by ITU-T. The Gigabit Passive Optical Network technology provides 2.5 Gbps bandwidth for single wavelength and the encapsulation method of the Gigabit Passive Optical Network technology provides an efficient and general mechanism to transmit different services, such as assigning the video, audio, image and other kinds of signals. In addition, the transmission convergence (TC) layer of the Gigabit Passive Optical Network is synchronous, and it uses the standard 8 kHz (1.25 us) frame to make sure Gigabit Passive Optical Network can directly support Time-Division Multiplex (TDM) service and that it is suitable for the transmission of the base station of the mobile network and the traditional dedicated line.

Therefore, how to increase the testing precision of the products of Gigabit Passive Optical Network is a subject worthy of attention.

BRIEF SUMMARY OF THE INVENTION

A testing system and method for Digital Diagnostic Monitoring Interface (DDMI) calibration test of RX POWER are provided to overcome the problems mentioned above.

An embodiment of the invention provides a testing system. The testing system comprises a terminal device which is configured to provide an optical signal, an optical attenuator which is configured to generate an attenuation optical signal according to the optical signal, a tested device which configured to generate an analog-to-digital (AD) value corresponding to the attenuation optical signal and a test-managing device which is configured to receive the analog-to-digital value and generate calibration values according to the analog-to-digital value and the attenuation optical signal. The test-managing device further transmits the calibration values to the tested device to test the tested device.

An embodiment of the invention provides a testing method. The testing method comprises: providing an optical signal; generating an attenuation optical signal according to the optical signal; generating an analog-to-digital (AD) value corresponding to the attenuation optical signal by a tested device; generating calibration values according to the analog-to-digital value and the attenuation optical signal; transmitting the calibration values to the tested device; and testing, by a test-managing device, the tested device which has obtained the calibration values.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
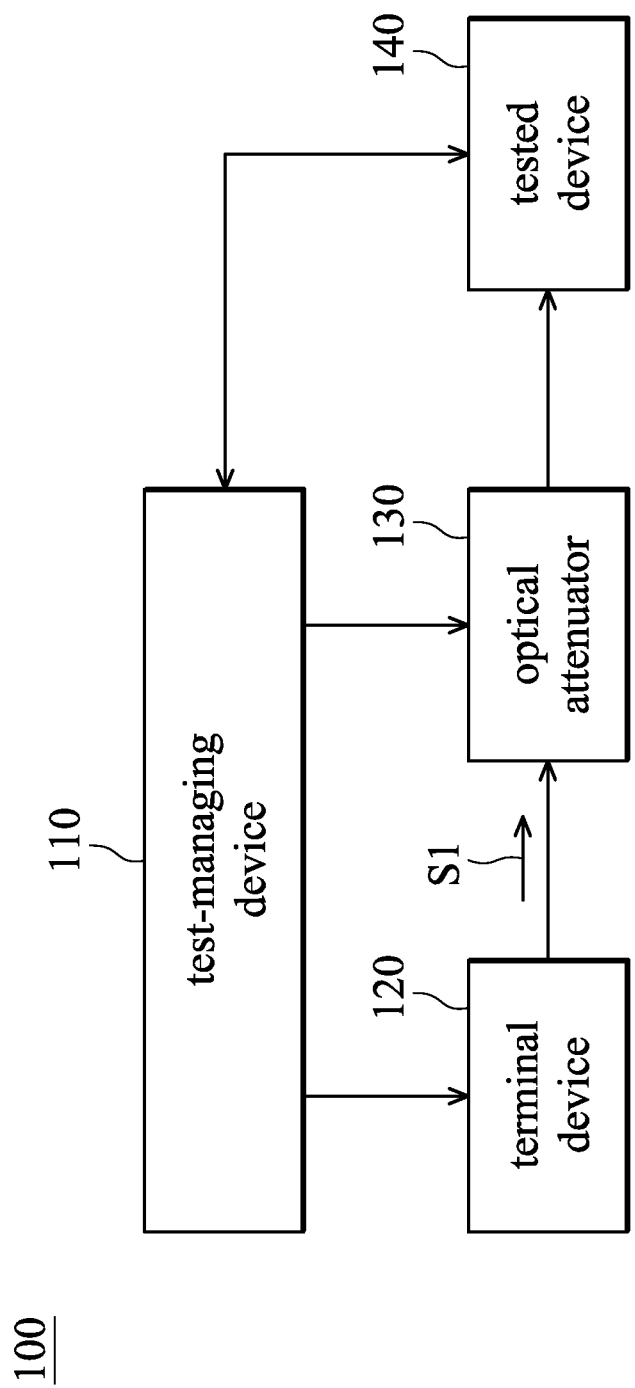
FIG. 1 is a block diagram of testing system 100 according to an embodiment of the invention.

FIG. 1 is a block diagram of a testing system 100 according to an embodiment of the invention. The testing system 100 is applied for calibration test of Digital Diagnostic Monitoring Interface (DDMI) of RX POWER. The testing system 100 comprises a test-managing device 110, and a terminal device 120, an optical attenuator 130 and a tested device 140. The tested device 140 is the device under test (DUT).

In an embodiment of the invention, the test-managing device 110 is a computer device or a processor with data or files processing ability. The test-managing device 110 is configured to the control terminal device 120 and the optical attenuator 130 and transmits data with the tested device 140. The terminal device 120 is an Optical Line Terminal (OLT), an Optical Network Terminal (ONT), or a Bi-directional Optical Sub Assembly (BOSA) or other assemblies in an Optical Line Terminal or Optical Network Terminal.

In an embodiment of the invention, when the tested device 140 processes Digital Diagnostic Monitoring Interface (DDMI) calibration of RX POWER, the test-managing device 110 may indicate the terminal device 120 to send an optical signal S1 to the optical attenuator 130. After receiving the optical signal S1, the optical attenuator 130 may generate an attenuation optical signal according to the attenuation parameter indicated by the test-managing device 110, and transmit the attenuation optical signal to the tested device 140, wherein the attenuation optical signal can be regarded as real inputting optical-power. In an embodiment of the invention, the test-managing device 110 may preset at least one attenuation parameter (e.g. non-attenuation (attenuate 0 dB), attenuate 5 dB, attenuate 15 dB etc.) to provide the optical attenuator 130 for generating attenuation optical signal corresponding to different attenuation parameters. Note that the values of attenuation parameters described above are only for illustrating the embodiment of the invention, and the invention is not limited thereto. The test-managing device 110 may adjust or set the attenuation parameters according to a different situation and a different tested device 140.

When the tested device 140 receives the attenuation optical signal, the tested device 140 may transform the attenuation optical signal to an analog-to-digital (AD) value, wherein different attenuation optical signal may be corresponded to different analog-to-digital value, namely, one inputting optical-power only can be corresponded to one analog-to-digital value. The analog-to-digital value is transmitted to the test-managing device 110 after the tested device 140 has generated the analog-to-digital value. Note that, the optical attenuator 130 may generate another attenuation optical signal after the tested device 140 has generated the analog-to-digital value corresponding to the prior attenuation optical signal. Then, the tested device 140 may generate another analog-to-digital value according to the new attenuation optical signal. As mentioned above, the optical attenuator 130 and the tested device 140 may generate new attenuation optical signals and analog-to-digital values repeatedly until the number of the attenuation optical signals and analog-to-digital values are enough to generate the calibration values. When the test-managing device 110 receives the analog-to-digital values, the test-managing device 110 may generate the calibration values according to all of the analog-to-digital values.

In an embodiment of the invention, the test-managing device 110 may put the attenuation optical signals and analog-to-digital values to the formula (1) to generate the calibration values, the formula (1) is shown as below:

$$y=ax^4+bx^3+cx^2+dx^3+e \quad (1)$$

wherein y is regarded as the attenuation optical signal (inputting optical-power), x is regarded as analog-to-digital value, and a, b, c, d, e are regarded as the calibration values. Note that in the formula (1), it takes five calibration values for example, therefore, the optical attenuator 130 needs to generate five attenuation optical signals (five values of y) to solve the calibration values a, b, c, d, e. However, it is to be understood that the number of the calibration values of the invention is not limited thereto.

When the test-managing device 110 generates the calibration values, the test-managing device 110 may transmit the calibration values (e.g. a, b, c, d, e) to the tested device 140 and indicate the optical attenuator 130 regenerate a new set of attenuation optical signals to test the testing precision of the tested device 140 which has obtained the calibration values. That is to say, after the tested device 140 has obtained the calibration values, the tested device 140 may generate an estimated optical power value according to the calibration values and the new analog-to-digital values transformed from the new set of attenuation optical signals regenerated by the optical attenuator 130. The test-managing device 110 may test the tested device 140 according to the relative error between the estimated optical power value and the attenuation optical signals (real inputting optical-power) generated by the optical attenuator 130.

In an embodiment of the invention, the test-managing device 110 may process an antilogarithm calculation to an optical power intensity of the attenuation optical signal generated by the optical attenuator 130 to reduce the relative error between the estimated optical power value and the attenuation optical signals (real inputting optical-power) generated by the optical attenuator 130.

Figure 2:
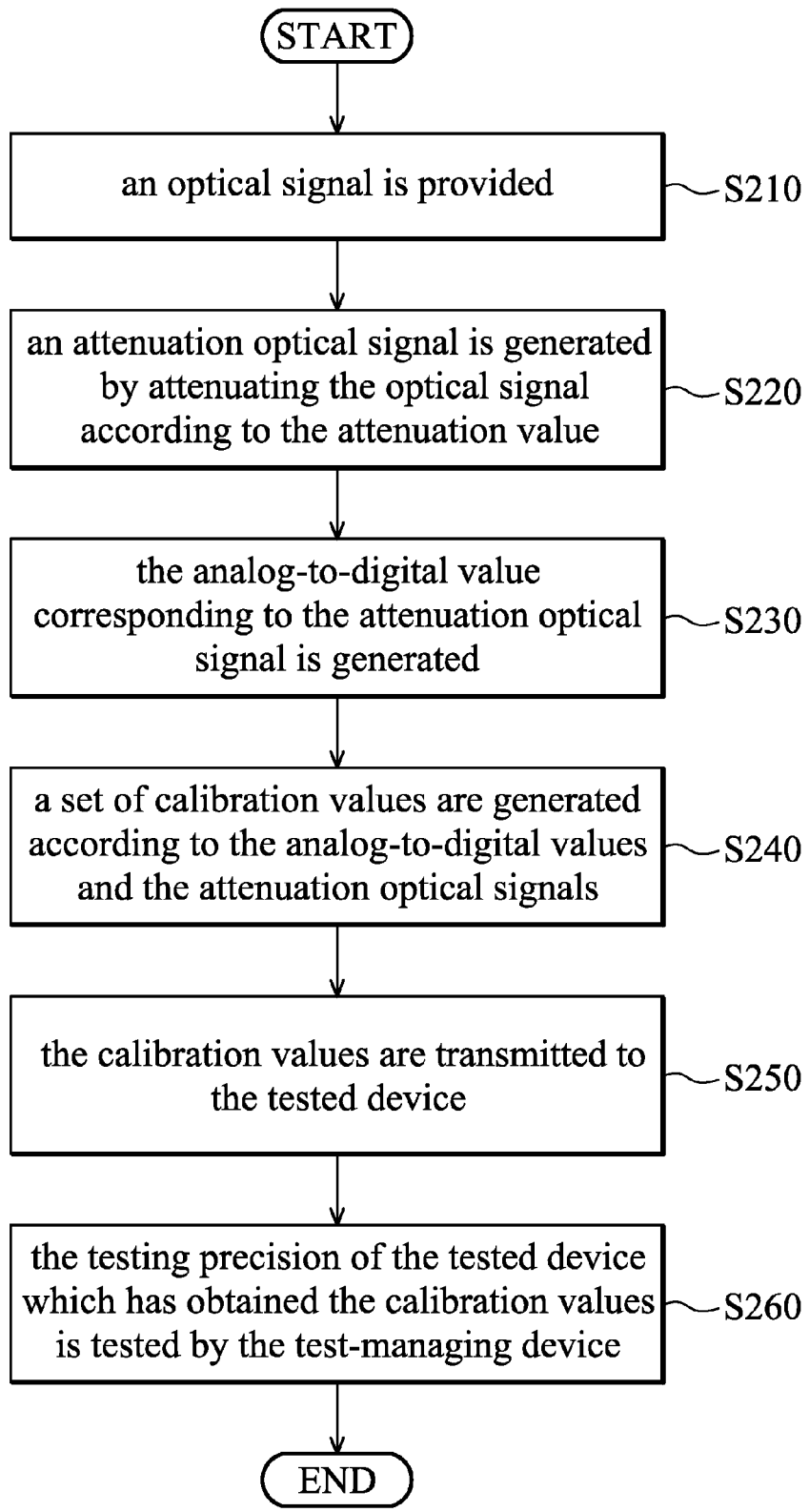
FIG. 2 is a flow chart illustrating the testing method according to an embodiment of the invention.

FIG. 2 is a flow chart illustrating the testing method according to an embodiment of the invention. The testing method is applied for the calibration test of Digital Diagnostic Monitoring Interface (DDMI) of RX POWER of the tested device 140. First, in step S210, an optical signal is provided by the terminal device 120. In step S220, the attenuation value (attenuation parameter) of the optical attenuator 130 is controlled by the test-managing device 110, and an attenuation optical signal is generated by attenuating the optical signal according to the attenuation value. In step S230, the analog-to-digital value corresponding to the attenuation optical signal is generated by the tested device 140, after the attenuation optical signal is received by the tested device 140. Then the tested device 140 transmits the analog-to-digital value to the test-managing device 110. Note that in different embodiments, the calibration values are generated according to a plurality of attenuation optical signals and analog-to-digital values, therefore, the step S220 and S230 may be repeated several times to generate different attenuation optical signals and analog-to-digital values. Taking the above embodiment as an example, if calibration values a, b, c, d, e are needed, the step S220 and S230 would be repeated to generate live different attenuation optical signals and five analog-to-digital values corresponding to different attenuation optical signals. In step S240, a set of calibration values are generated according to the analog-to-digital values and the attenuation optical signals by the test-managing device 110. In step S250, the calibration values are transmitted to the tested device 140 by the test-managing device 110. In step S260, the testing precision of the tested device 140 which has obtained the calibration values is tested by the test-managing device 110.

In an embodiment of the invention, the testing method further comprises an estimated value (estimated optical power value) being generated by the tested device 140 according to the calibration values and regenerated analog-to-digital values after the tested device 140 obtained the calibration values, wherein in the embodiment, the analog-to-digital values are transformed from a new set of attenuation optical signals which are regenerated by the optical attenuator 130. In an embodiment of the invention, after the estimated value is generated the testing method further comprises that the testing precision of the tested device 140 is tested by the test-managing device 110 according to the estimated value generated by the tested device 140 and the optical power of the new set of attenuation optical signals.

In an embodiment of the invention, the testing method further comprises an optical power intensity of the attenuation optical signal being processed in an antilogarithm calculation by the test-managing device 110.

The yield rate of tested devices may be tested according the testing method for calibration test of the Digital Diagnostic Monitoring Interface (DDMI) of RX POWER in the embodiments of the invention. In addition, the testing method may process an antilogarithm calculation to an optical power intensity of the attenuation optical signal to reduce the relative error between the estimated optical power value and the real inputting optical-power.

The steps of the method and algorithm described in connection with the aspects disclosed herein may be carried out directly in hardware, in a software module executed by a processor, or in a combination of the two. A software module (e.g. including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral with the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A testing system, comprising:
   a terminal device, configured to provide an optical signal;
   an optical attenuator, configured to generate an attenuation optical signal according to the optical signal;
   a tested device, configured to generate an analog-to-digital (AD) value corresponding to the attenuation optical signal; and
   a test-managing device, configured to receive the analog-to-digital value, generate calibration values according to the analog-to-digital value and the attenuation optical signal, and transmit the calibration values to the tested device to test the tested device,
   wherein the tested device generates an estimated value according to the calibration values and regenerated analog-to-digital values after the tested device obtained the calibration values, wherein the regenerated analog-to-digital values are transformed from regenerated attenuation optical signals regenerated by the optical attenuator.

2. The testing system of claim 1, wherein the test-managing device is further configured to control the attenuation optical signal provided by the terminal device.

3. The testing system of claim 1, wherein the test-managing device is further configured to transmit at least one attenuation parameter to the optical attenuator to generate the attenuation optical signal.

4. The testing system of claim 1, wherein the test-managing device is further configured to process an antilogarithm calculation to an optical power intensity of the attenuation optical signal generated by the optical attenuator.

5. The testing system of claim 1, wherein the test-managing device may test the tested device according to the estimated value and the regenerated attenuation optical signals.

6. A testing method, comprising:
   providing an optical signal;
   generating an attenuation optical signal according to the optical signal;
   generating an analog-to-digital (AD) value corresponding to the attenuation optical signal by a tested device;
   generating calibration values according to the analog-to-digital value and the attenuation optical signal;
   transmitting the calibration values to the tested device;
   generating, by the tested device, an estimated value according to the calibration values and regenerated analog-to-digital values after the tested device obtained the calibration values, wherein the regenerated analog-to-digital values are transformed from regenerated attenuation optical signals regenerated by the optical attenuator; and
   testing, by a test-managing device, the tested device which has obtained the calibration values.

7. The testing method of claim 6, further comprising:
   controlling, by the test-managing device, the provided optical signal.

8. The testing method of claim 6, further comprising:
   generating, by the test-managing device, at least one attenuation parameter to generate the attenuation optical signal.

9. The testing method of claim 6, further comprising:
   processing, by the test-managing device, an antilogarithm calculation to an optical power intensity of the attenuation optical signal.

10. The testing method of claim 6, further comprising:
    testing, by the test-managing device, the tested device according to the estimated value and the regenerated attenuation optical signals.

* * * * *